Nov. 28, 1933.      W. KIESER      1,937,349
REGULATION OF A PLURALITY OF PRIME MOVERS
Filed Sept. 5, 1931      2 Sheets-Sheet 2

Inventor:
Walter Kieser,
by Charles E. Tullar
His Attorney.

Patented Nov. 28, 1933

1,937,349

UNITED STATES PATENT OFFICE 1,937,349

REGULATION OF A PLURALITY OF PRIME MOVERS

Walter Kieser, Berlin-Charlottenburg, Germany, assignor to General Electric Company, a corporation of New York Application September 5, 1931, Serial No. 561,455, and in Germany September 19, 1930

7 Claims. (Cl. 60—102)

The present invention relates to the regulation of a plurality of prime movers, and has for its object the provision of an improved control mechanism by means of which an equal distribution of load among a plurality of prime movers such as elastic fluid engines may be obtained.

It is well known to those skilled in the art that a speed regulator has a certain characteristic or sensitivity and that accordingly a load is distributed equally among two or more prime movers if the speed regulators of these prime movers have the same characteristic or degree of sensitivity. If the sensitivities of the speed regulators of two prime movers differ from each other they will cause a determined load distribution which, however, is unequal owing to the different sensitivities of their speed regulators. This drawback is prevented according to my invention by the provision of a single isochronous governor with respect to one of the prime movers hereinafter termed the main prime mover, and by arranging a remote control mechanism for regulating the other prime movers in terms of conditions of the first prime mover.

For a better understanding of what I consider to be novel and my invention, attention is directed to the following description and the claims in connection with the drawings appended hereto.

Figure 1:
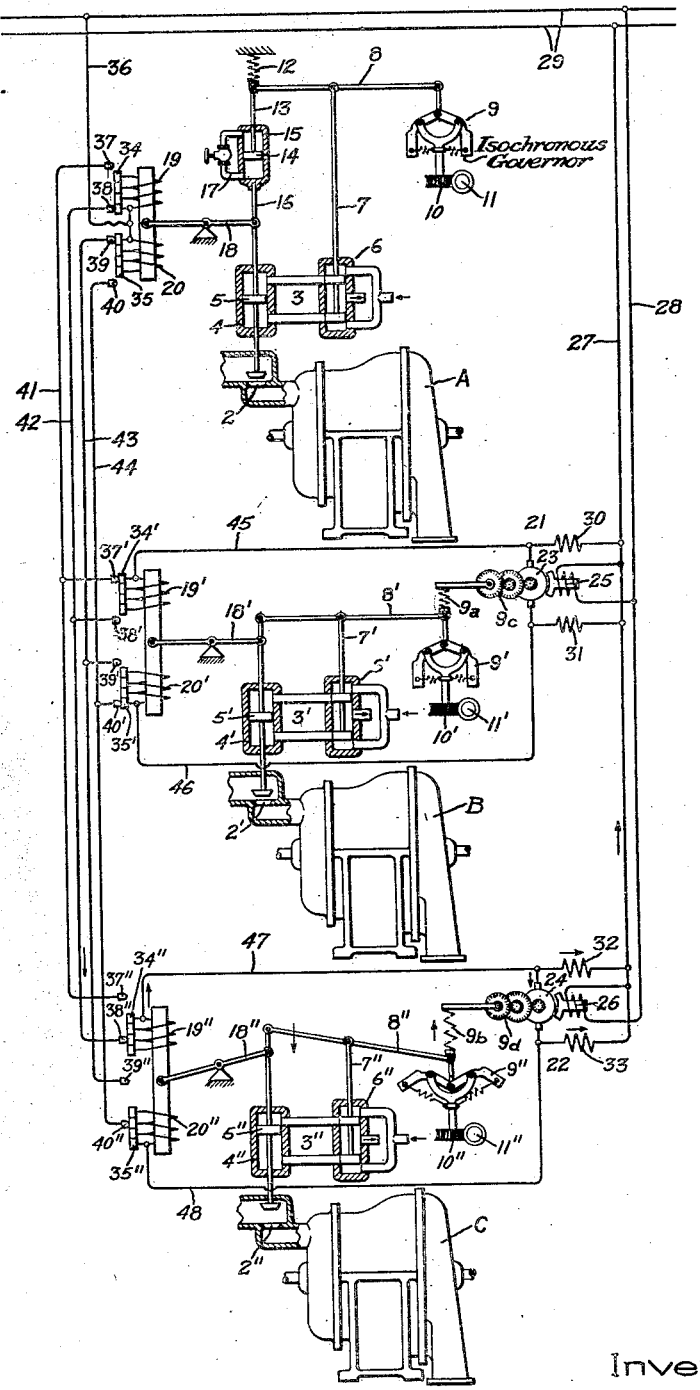
Figure 2:
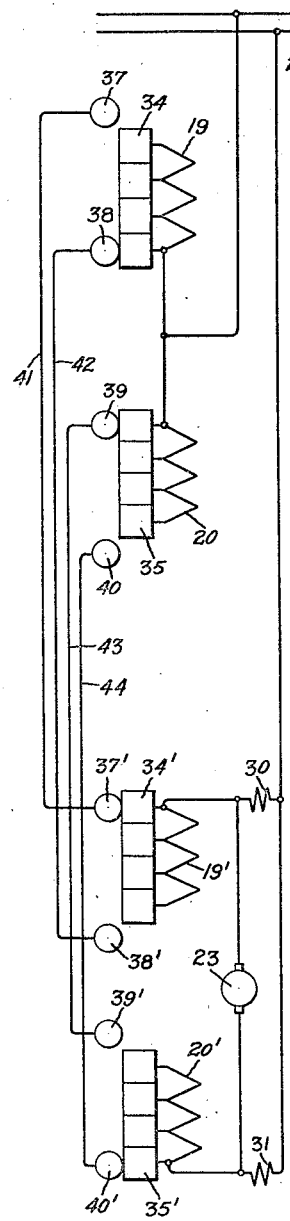
Figure 3:
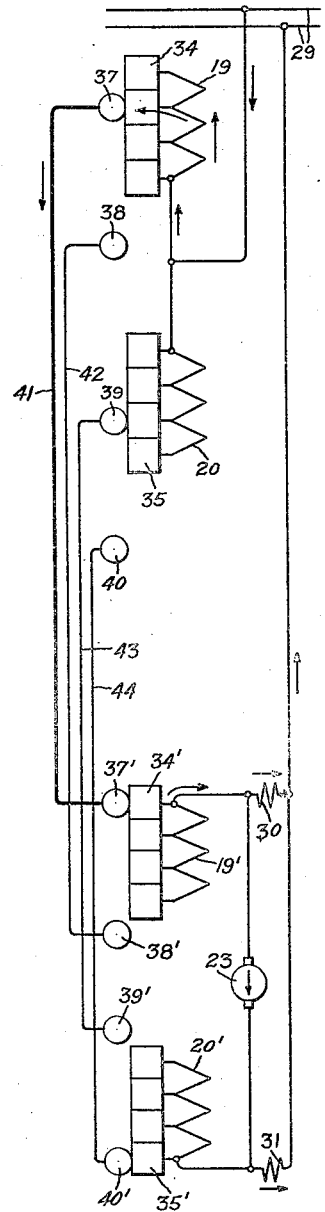
Figure 4:
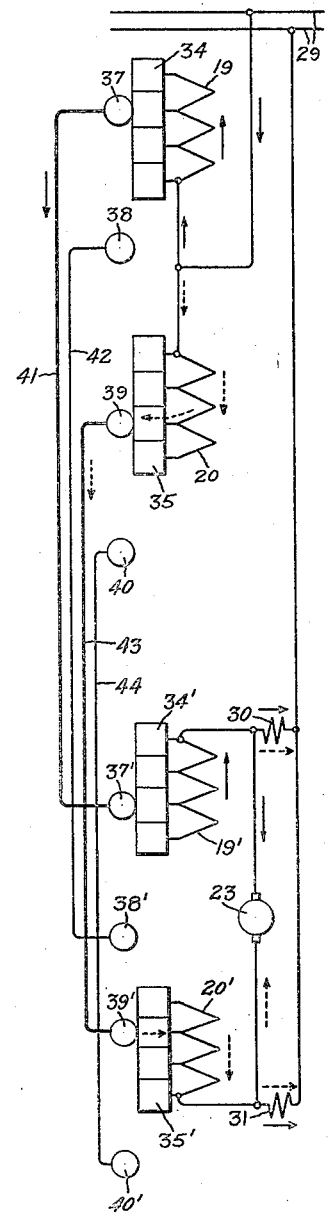

In the drawings, I have shown in Fig. 1 a part of a power plant embodying my invention, and Figs. 2 to 4 illustrate different positions of certain of the parts shown in Fig. 1.

Referring to Fig. 1, I have shown by way of example three elastic fluid turbines A, B and C forming a part of a power plant among which the peak load is to be equally distributed. Certain parts of the mechanism pertaining to turbines B and C are substantially the same as those pertaining to turbine A and will therefore be designated hereafter with the same reference characters provided with one and two prime signs respectively.

Provided in the inlet of turbine A is a valve 2 for regulating the admission of elastic fluid. The valve is moved by a hydraulic motor 3 comprising a cylinder 4 in which a piston 5 is movably arranged and connected to the stem of the valve. This motor is controlled by a pilot valve 6. Pilot valve stem 7 is connected to an intermediate point of a floating lever 8, to one end of which is pivotally connected a speed governor 9, in the present instance shown as a flyball governor which is driven through a worm gear 10 from the shaft 11 of turbine A. The other end of floating lever 8 is connected to a spring 12 and pivoted to stem 13 of a piston 14 arranged in a dashpot cylinder 15 which in turn is fixed to the upper part of stem 16 of the hydraulic cylinder piston 5. Provided with respect to the upper and lower part of the dashpot is an adjustable by-pass 17. An intermediate point of stem 16 between the motor and the dashpot is pivotally connected to a fulcrumed lever 18, the other end of which forms a support for two resistances 19 and 20 which will later be described more fully. The regulating mechanism pertaining to turbines B and C is substantially the same as that of turbine A except that turbines B and C are not provided with the isochronous arrangement pertaining to turbine A and formed by the dashpot and the spring 12.

On the other hand, I provide the regulating mechanisms pertaining to turbines B and C with synchronizing arrangements, in the present instance shown as comprising synchronizing springs 9a and 9b respectively, the tension of which is adjusted through suitable gears 9c and 9d respectively, which are driven in either direction by reversible motors 21 and 22 respectively. In the present instance I have shown these motors as being of the compound type comprising armatures 23 and 24 respectively, shunt fields 25 and 26 respectively, which are connected through lines 27 and 28 to a source of supply 29. The motors are also provided with coils 30, 31 and 32, 33 respectively. One of these coils of each motor under certain conditions is connected in series with the armature with respect to the flow of current while the other coils are connected in shunt, and vice versa.

The resistances 19 and 20, which I have shown by way of example as ohmic resistances tapped at a number of points which are connected to two sets of segments 34 and 35 respectively. The adjacent ends of the resistances are connected by a wire 36 to the electric source of supply. 37, 38, 39 and 40 are brushes bearing against the sets of segments 34 and 35 respectively, and connected by lead wires 41, 42, 43 and 44 to the brushes 37' to 40' and 37" to 40" pertaining to turbines B and C respectively. The opposite ends of resistances 19' and 20' are connected to the brushes and the fields of motor 21 by lead wires 45 and 46 respectively. In a similar manner the opposite ends of resistances 19" and 20" are connected by wires 47 and 48 respectively to motor 22. The circuit connections with respect to the motors are such that they rotate in one direction when they are supplied with current through lead wires 45 and 47 respectively, and rotate in the opposite direction when they are supplied through wires 46 and 48 respectively. This is due to the fact that these connections cause the electric current to flow through the armature in different directions, that is, as will be clearly seen from the drawings, if the motor pertaining to turbine B for instance is supplied through wire 45 the current will flow through the armature in downward direction and if the motor is supplied through wire 46 the current will flow through the armature in upward direction. If electric current is supplied to motor 21 through wires 45 and 46 simultaneously the motor will rotate in a direction corresponding to that current which exceeds the other current. It will be understood that no rotation of the armature takes place if both currents are equal, as in this case the two currents compensate each other. The shunt coils 25 and 26 are directly connected to supply conductors 29. Regarding the other coils 30, 31 and 32, 33, as well as the armatures 23 and 24, I have arranged remote control means in such manner that no current flows through said parts while the mechanism is in an intermediate position corresponding to a given load of the plant. This intermediate position has been shown with respect to main turbine A and turbine B. It will be noted that in this position no current can flow through wire 36, resistances 19, 20, to the resistances 19' 20' because they are open circuited.

The operation of my mechanism is as follows: In the example shown in Fig. 1, the regulating mechanisms pertaining to the main turbine A and the turbine B are shown as being in balanced condition in an intermediate position where no current supply to motor 21 takes place, as already mentioned above. The regulating mechanism of turbine C, however, has been shown as being out of balanced position with respect to the main turbine A. This causes a supply of current through the electric remote control mechanism from line 29 through wire 36 over a segment 34, wire 42, brush 38'', a part of resistance 19'', wire 47, armature 24 (in downward direction) and field coils 32 and 33, back through wire 27 to the opposite pole of the electric source 29 as indicated by arrows. The flow of current through armature 24 in downward direction causes a positioning of speed governor 9'' which effects the pilot valve 6'' to move downwardly and to permit oil to be supplied to the upper part of cylinder 4'' and drained off from the lower part thereof, resulting in a downward movement of piston 5'' and accordingly a closing movement of valve 2''. The downward movement of piston 5'' causes a corresponding movement of the pilot valve which thereby resumes its original position and this movement also causes a turning movement of fulcrumed lever 18'' in a clockwise direction and accordingly an upward movement of the resistances 19'' and 20''. This actuation, particularly the upward movement of the resistances, continues until the latter resume a position corresponding to the positions of the resistance pertaining to the main turbine. As soon as this position is reached the circuit between brush 38'' and the segments 34'' is interrupted. With respect to the operation, the electric parts pertaining to the main turbine may be termed "sending means" and the corresponding parts pertaining to turbines B and C may be termed "receiving means".

Whereas I have shown the admission valve of turbine C as being open too much with respect to the valve of the main turbine, it will be understood that in case the valve 2'' of turbine C is closed too much with respect to the valve 2 of the main turbine A, current would flow through wire 43, over resistance 20'', through wire 48 and the armature 24, but now in an opposite direction. This opposite flow of current through armature 24 causes a movement of the valve mechanism in opposite direction.

Referring to the operation of the main turbine it will be seen that an increase of speed owing to a decrease in load causes an outward movement of the weights of the flyball governor 9 to the effect that the right end of lever 8 moves downward and causes a corresponding movement of the pilot valve 6, permitting oil to be supplied to the upper part of the hydraulic cylinder 4 and drained off from the lower part thereof. Piston 5 thereby moves downwardly, resulting in a closing movement of valve 2. If the downward movement of piston 5 takes place within a very short time, the dashpot 15 and its piston 14 will move more or less as a unit owing to the fact that the oil contained in the cylinder has not sufficient time to be displaced between the lower and upper part through bypass 17. After the movement of piston 5 has terminated, the spring 12 acting on the stem 13 of dashpot piston 15 will gradually return floating lever 8 to its normal position whereby piston 14 moves within the dashpot and causes displacement of the liquid between the upper and lower part of the cylinder.

The movement of stem 16 causes a turning movement of the fulcrumed lever 18 which thereby shifts the coils 19 and 20 with respect to the brushes 37 to 40 and establishes connection between the electric source of supply and the motors of turbines B and C. The individual steps of this operation will be more readily understood in connection with Figs. 2 to 4 in which I have shown an enlarged scale diagram of the electric circuits of turbines A and B in different positions of the shifting mechanism, it being understood that either the coils or the brushes may be shifted. The shunt coils 25 and 26 of the motors have been omitted in these figures. Fig. 2 illustrates the intermediate position of the control mechanism corresponding to Fig. 1 where no current flows through the lead wires 41 to 44, as for instance, lead wire 41 is connected to a segment 34' but disconnected with respect to the segments 34. Wire 42 is connected to segment 34 but disconnected with respect to segments 34', etc. If now, for instance, the resistances 19 and 20 are moved in an upward direction owing to a clockwise turning movement of fulcrumed lever 18 they will change their relative position with respect to brushes 37 to 40 and establish a connection to the motor 23 as shown in Fig. 3. In this case a current flows from line 29 through a part of resistance 19, over brush 37, wire 41 (shown as a heavy line), brush 37', armature 23, field coils 30 and 31, back to line 29 as indicated by arrows. The supply of current to motor 21 will cause a rotation thereof and accordingly a setting of synchronizing spring 9a of Fig. 1 which in turn initiates a movement of the hydraulic motor 3', resulting in a positioning of valve 2' and a turning movement of lever 18'. The latter movement causes a shifting of coils 19' and 20' with respect to brushes 37' to 40' to the effect that a new condition in the supply of current through motor 21 is established, namely, it will be seen that the upward movement of segments 35' causes a connection between resistances 20 and 20' through brushes 39 and 39', resulting in a flow of current from line 29 through resistance 20, brushes 39, 39', resistance 20' and the armature back to line 29. The flow of this current through the armature is opposed to the current which originally flowed therethrough and thereby partly compensates this latter current. The shifting movement of segments 34' and 35' with respect to brushes 37' and 39' continues until these parts have assumed a position in which the currents flowing in opposite direction through armature 23 compensate each other. This condition has been illustrated in Fig. 4 where it will be noted that the current flowing from line 29 through resistances 19, 19' has to overcome two-thirds of each of these resistances and that the current flowing through resistances 20 and 20' has also to overcome two-thirds of these resistances, it being understood that the resistances are equal to each other and equally subdivided. This means, however, that like resistances are inserted in each circuit and therefore cause the same current to flow in opposite directions through the armature 23, or the same electric potential to exist with respect to the brushes of the armature. Hence no current flows in reality through armature 23 and therefore no rotation thereof takes place. Lines 41 and 43 have been indicated heavier and the two currents flowing in the circuit are indicated by full and dotted arrows respectively.

It will be readily understood from the above description that only in a position where the different valve operating mechanisms are in perfectly balanced condition with respect to the electric remote control systems no actuation of the valves takes place, and it will be also understood that a change of the condition with respect to the main turbine A causes exactly this same change of the turbines B and C, resulting in a substantially uniform distribution of load among the different turbines.

Having described the method of operation of my invention, together with the apparatus which I now consider to represent the best embodiment thereof, I desire to have it understood that the apparatus shown is only illustrative and that the invention may be carried out by other means.

What I claim as new and desire to secure by Letters Patent of the United States is:

1. In a power plant, the combination of a plurality of prime movers and means for equally distributing a load among them comprising an isochronous governor for one prime mover, a speed governor for each of the other prime movers, and a remote control mechanism for setting the speed governors of the other prime movers in terms of regulating movement of the isochronous governor.

2. In a power plant, the combination of a plurality of elastic fluid engines, a valve means for each of the engines for controlling the supply of elastic fluid thereto, an isochronous governing mechanism for controlling the valve of one of the engines, and a speed governing mechanism for the valve means of each other engine, and remote control means for setting the speed governing mechanisms of said other engines in response to the valve setting of the engine which is regulated by the isochronous governor, the remote control means including an electric bridge mechanism having a member for each engine moved by the valve means of said engine whereby balanced condition of the bridge mechanism is obtained only with equal setting of the different valve means.

3. In a power plant, the combination of a plurality of elastic fluid engines, a valve for each engine for controlling the supply of elastic fluid thereto, an isochronous governing mechanism for controlling the valve of one engine, a speed governor and a synchronizing device for each of the other engines, and a remote control means for actuating the synchronizing devices of the other engines in terms of movement of the valve of said engine which is regulated by the isochronous governing mechanism.

4. In a power plant, the combination of a plurality of elastic fluid turbines, a valve for each of the turbines for controlling the supply of elastic fluid thereto, an isochronous governing mechanism for one of the turbines, a speed governor and a spring for each valve of the other turbines, a synchronizing device including a motor for each spring, and means actuated by the isochronous governing mechanism for controlling the movements of said motors.

5. In a power plant, the combination of a plurality of elastic fluid engines, a valve for each of the engines for controlling the supply of elastic fluid thereto, an isochronous governing mechanism for controlling the valve of one engine, a speed governor and a synchronizing device for the other engines, remote control means for actuating the synchronizing devices of the other engines in terms of movement of the valve of said engine which is regulated by the isochronous governing mechanism, said remote control mechanism comprising a source of electric supply, tapped resistances for each elastic-fluid engine and means for moving the resistances in response to movement of the valves of the corresponding engines, brushes which are relatively fixed with respect to the resistances, wires for connecting the corresponding brushes pertaining to the different engines with each other and wires for connecting the resistances with the synchronizing motors of the corresponding engines.

6. In a power plant, the combination of at least two prime movers, a regulating element for each prime mover, an isochronous governing mechanism for controlling the element of one prime mover, a speed governor and a synchronizing device for controlling the regulating element of the other prime mover, a remote control mechanism for actuating the synchronizing device of the other prime mover in terms of movement of the isochronously regulated element, said mechanism including an electric source of supply, a resistance connected to the source of supply and moved by the isochronously regulated element, another resistance moved by the regulating element of the other prime mover and connected to the synchronizing device, and a contact making means for connecting the two resistances.

7. In a power plant, the combination of at least two prime movers, a regulating element for each prime mover, an isochronous governing mechanism for controlling the element of one prime mover, a speed governor and a synchronizing device for controlling the regulating element of the other prime mover, a remote control mechanism for actuating the synchronizing device of the other prime mover in response to movement of the isochronously regulated element, said mechanism including an electric source of supply, a resistance member and a contact making member for each regulating element, and means for moving one of the members in response to movement of the isochronously regulated element. WALTER KIESER.